(12) United States Patent
Vasil et al.

(10) Patent No.: US 8,549,536 B2
(45) Date of Patent: Oct. 1, 2013

(54) PERFORMING A WORKFLOW HAVING A SET OF DEPENDANCY-RELATED PREDEFINED ACTIVITIES ON A PLURALITY OF TASK SERVERS

(75) Inventors: Timothy J. Vasil, Cambridge, MA (US); Philip Notick, Newtown, MA (US)

(73) Assignee: Autonomy, Inc., San Francisco, CA (US)

( * ) Notice: Subject to any disclaimer, the term of this patent is extended or adjusted under 35 U.S.C. 154(b) by 655 days.

(21) Appl. No.: 12/627,145

(22) Filed: Nov. 30, 2009

(65) Prior Publication Data

US 2011/0131448 A1 Jun. 2, 2011

(51) Int. Cl.
*G06F 9/46* (2006.01)

(52) U.S. Cl.
USPC .................. 718/106; 718/100; 718/102

(58) Field of Classification Search
None
See application file for complete search history.

(56) References Cited

U.S. PATENT DOCUMENTS

| | | | |
|---|---|---|---|
| 5,826,239 A | 10/1998 | Du et al. | |
| 5,937,388 A | 8/1999 | Davis et al. | |
| 6,397,192 B1 | 5/2002 | Notani et al. | |
| 7,127,716 B2 | 10/2006 | Jin et al. | |
| 7,197,749 B2 * | 3/2007 | Thornton et al. | 718/101 |
| 7,401,112 B1 * | 7/2008 | Matz et al. | 709/202 |
| 8,099,480 B1 * | 1/2012 | Muthusrinivasan et al. | 709/222 |
| 2002/0078117 A1 * | 6/2002 | Wang Baldonado et al. | 709/101 |
| 2002/0178037 A1 | 11/2002 | Reading et al. | |
| 2004/0143597 A1 | 7/2004 | Benson et al. | |
| 2005/0125557 A1 | 6/2005 | Vasudevan et al. | |
| 2005/0171930 A1 * | 8/2005 | Arning et al. | 707/2 |
| 2005/0234902 A1 * | 10/2005 | Meredith et al. | 707/4 |
| 2006/0218200 A1 | 9/2006 | Factor et al. | |
| 2007/0101179 A1 | 5/2007 | Chafle et al. | |
| 2007/0156874 A1 | 7/2007 | Magro et al. | |
| 2007/0214161 A1 | 9/2007 | Goyal et al. | |
| 2007/0294697 A1 * | 12/2007 | Theimer et al. | 718/102 |
| 2008/0276242 A1 * | 11/2008 | Taniguchi et al. | 718/103 |
| 2009/0158281 A1 * | 6/2009 | Omori | 718/101 |

(Continued)

FOREIGN PATENT DOCUMENTS

| | | |
|---|---|---|
| JP | 2007265043 | 10/2007 |
| JP | 2008176804 | 7/2008 |

OTHER PUBLICATIONS

Benedyczak, et al., "UNICORE as Uniform Grid Environment for Life Sciences," European Grid Conference 2005, Lecture Notes in Computer Science 3470, pp. 364-373, 2005.

(Continued)

*Primary Examiner* — Meng An
*Assistant Examiner* — Tammy Lee

(57) ABSTRACT

A technique of performing a workflow on a plurality of task servers involves starting a plurality of task server processes on the plurality of task servers. Each task server provides an operating system which is constructed and arranged to locally run a respective task server process. The technique further involves receiving a workflow which includes a set of dependency-related predefined activities, and placing task identifiers in a queue structure based on the received workflow. The task identifiers identify tasks to be performed in a distributed manner by the plurality of task server processes started on the plurality of task servers. Each task is a specific execution of a dependency-related predefined activity of the workflow. Progress in performing the workflow is made as the plurality of task server processes (i) claim task identifiers from the queue structure and (ii) perform the tasks identified by the claimed task identifiers.

20 Claims, 6 Drawing Sheets

(56) References Cited

U.S. PATENT DOCUMENTS

2009/0260009 A1* 10/2009 Pinto et al. .................. 718/100
2009/0287703 A1* 11/2009 Furuya .............................. 707/8
2010/0058197 A1* 3/2010 Chee et al. ................... 715/751

OTHER PUBLICATIONS

Sun, et al., "Hierarchical Dependence Graphs for Dynamic JDF Workflows," 2006 IEEE International Conference on Systems, Man, and Cybernetics, Taipei, Taiwan, pp. 2747-2752, Oct. 8-11, 2006.

"Windows Workflow Foundation", http://en.wikipedia.org/wiki/Windows_Workflow_Foundation, downloaded on Nov. 6, 2009, pp. 1-5.

Shrivastava, S.K., et al., "Architectural Support for Dynamic Reconfiguration of Large Scale Distributed Applications", May 4, 1998, pp. 1-8.

Smith, Warren, et al., "An Execution Service for Grid Computing", NAS Technical Report NAS-04-044, Apr. 2004, pp. 1-8.

"Search report on Japan Application No. 2010-260113," Japan Patent Office, dated Nov. 20, 2012, 6 pages.

* cited by examiner

| TASK SERVER PROCESS ID | LAST PING TIME | CPU UTILIZATION | TASK COUNT | FREE MEMORY | ADDITIONAL INFORMATION |
|---|---|---|---|---|---|
| 124 | 126 | 128 | 130 | 132 | 134 |
| . . . | . . . | . . . | . . . | . . . | . . . |

FIG. 5

PERFORMING A WORKFLOW HAVING A SET OF DEPENDANCY-RELATED PREDEFINED ACTIVITIES ON A PLURALITY OF TASK SERVERS

BACKGROUND

A conventional workflow application runs natively on a single physical machine thus providing a workflow development and execution platform which enables a user to construct and execute workflow-based programs. In contrast to a traditional approach to simply writing lines of code, the workflow application user constructs a workflow-based program by creating separate workflow activities and then linking the separate workflow activities together.

At runtime, the workflow application running natively on the single physical machine executes the workflow activities in order based on how the activities are linked with respect to each other. In particular, the workflow application treats each activity as a discrete (or atomic) piece of logic which is interdependent with the other activities of the workflow.

For example, if activity B depends from activity A, the workflow application does not execute activity B until the workflow application has finished executing activity A. A conventional workflow platform similar to that described above is the Windows Workflow Foundation (WF) technology provided by Microsoft Corporation of Redmond, Wash.

SUMMARY

Unfortunately, there are deficiencies to the above-described conventional workflow application. For example, the above-described conventional workflow application does not scale well. Rather, the capacity of the conventional workflow application is limited to the processing power of the single physical machine on which it natively runs.

Additionally, the above-described conventional workflow application does not handle activity failures well. In particular, the conventional workflow application does not provide a straight forward mechanism for detecting activity failures and for gracefully recovering when a partially performed activity fails to complete. Without a reliable mechanism to properly handle these situations, the uncompleted activity can impede the ability of the workload to make further progress by remaining in a hung or runaway state and thus hindering execution of other activities.

In contrast to the above-described conventional workflow application, improved techniques utilize multiple task servers equipped with operating systems that locally run task server processes. These task server processes running on the task servers claim workflow tasks (i.e., instantiations of predefined activities) from a scheduling queue which identifies ready-to-execute workflow tasks. When a task server process has completed a task, the task server process claims a new task from the queue. As a result, tasks are naturally load balanced across the task servers as the task server processes claim new tasks upon completion of current tasks. Additionally, if a partially performed task fails or improperly stalls, a workflow management server is able to detect this situation and roll back any transactions of that task and then re-queue task performance, i.e., queue a new task that can complete all of the transactions successfully. Accordingly, the improved techniques provide reliable fault handling.

One embodiment is directed to a method of performing a workflow on a plurality of task servers. The method includes starting a plurality of task server processes on the plurality of task servers. Each task server provides an operating system which is constructed and arranged to locally run a respective task server process. The method further includes receiving a workflow which includes a set of dependency-related predefined activities, and placing task identifiers in a queue structure based on the received workflow. The task identifiers identify tasks to be performed in a distributed manner by the plurality of task server processes started on the plurality of task servers.

Each task is a specific execution of a dependency-related predefined activity of the workflow. Progress in performing the workflow is made as the plurality of task server processes (i) claim task identifiers from the queue structure and (ii) perform the tasks identified by the claimed task identifiers.

Another embodiment is directed to a system to perform a workflow which includes a set of dependency-related predefined activities. The system includes a plurality of task servers, and a workflow management server coupled to the plurality of task servers. Within the system, the workflow management server is constructed and arranged to start a plurality of task server processes on the plurality of task servers. Each task server provides an operating system to locally run a respective task server process. The workflow management server is further constructed and arranged to maintain a queue structure, and place task identifiers in the queue structure. As in the earlier-mentioned method, the task identifiers identify tasks to be performed in a distributed manner by the plurality of task server processes started on the plurality of task servers. Each task is a specific execution of a dependency-related predefined activity of the workflow. Progress in performing the workflow is made as the plurality of task server processes (i) claim task identifiers from the queue structure and (ii) perform the tasks identified by the claimed task identifiers.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 5 is a diagram of a process table which is maintained by the distributed workflow controller of FIG. 2.

DETAILED DESCRIPTION

Overview

An improved technique utilizes multiple task servers (i.e., virtual machines, physical machines, or combinations thereof) running task server processes. The task server processes claim workflow tasks from a queue of ready-to-execute workflow tasks (i.e., instantiations of workflow activities). Such operation load balances the tasks among the multiple task servers. Furthermore, if a partially performed task has failed, a workflow management server is able to detect the failure, roll back any performed transactions of that task if necessary, and then re-queue the task. As a result, the technique provides reliable fault tolerance.

Figure 1:
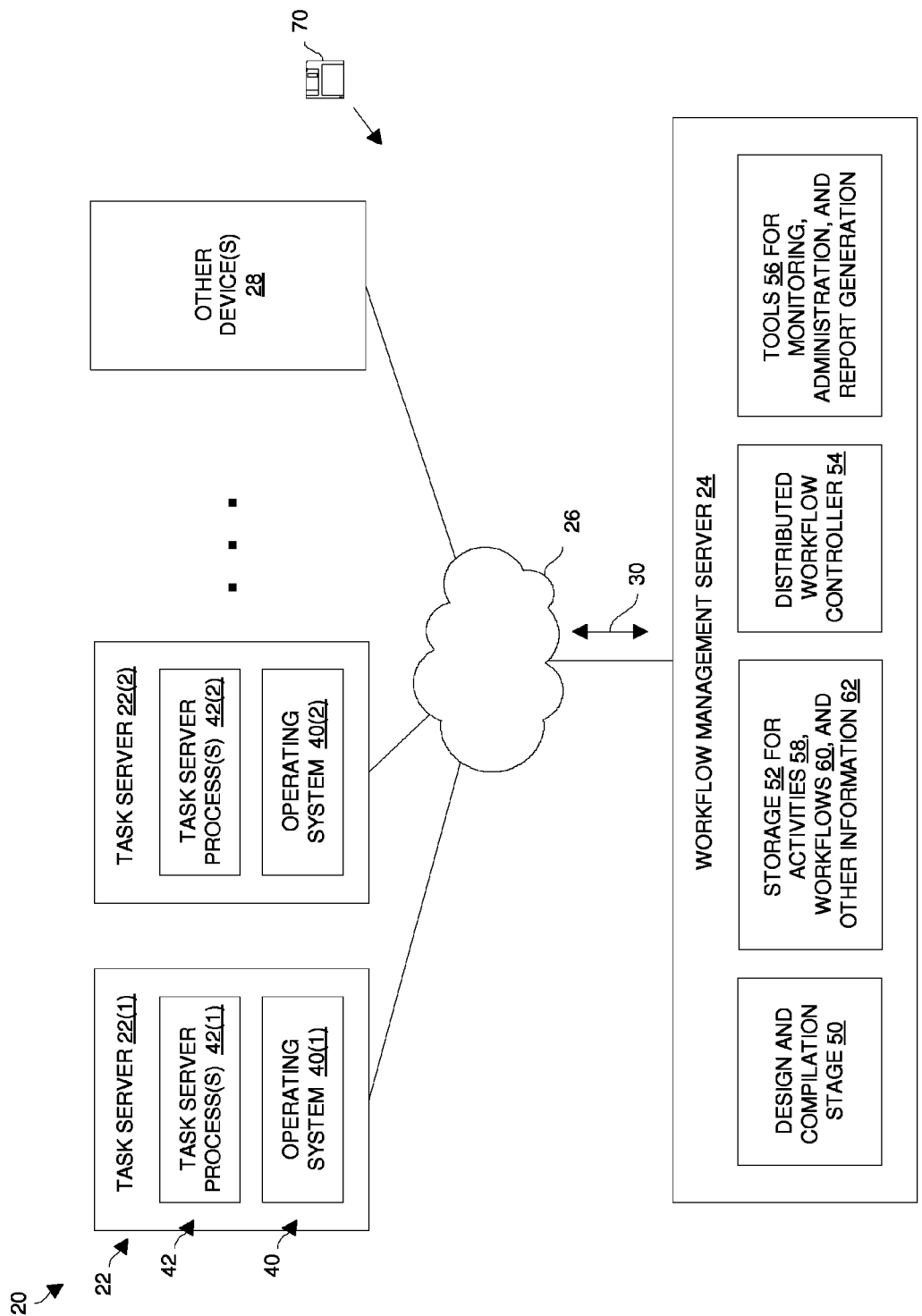
FIG. 1 is a block diagram of a workflow system which is constructed and arranged to perform a workflow that includes a set of dependency-related predefined activities.

FIG. 1 shows a workflow system 20 which is constructed and arranged to perform a workflow in a distributed manner. The workflow system 20 includes task servers 22(1), 22(2), . . . (collectively, task servers 22), a workflow management server 24, and a communications medium 26. The task servers 22 are able to communicate with the workflow management server 24 as well as with each other and perhaps one or more other devices 28 by exchanging electronic data signals 30 through the communications medium 26.

The communications medium 26 preferably includes computer networking equipment for robust and reliable communications (e.g., cables, switches, routers, fiber optic devices, wireless devices, other network components, combinations thereof, etc.).

Accordingly, the electronic data signals 30 may include packets, cells, frames, fiber optic signals, wireless signals, combinations thereof, etc. Additionally, the communications medium 26 is illustrated as a network cloud since it is capable of having a variety of topologies (e.g., hub-and-spoke, ring, backbone, irregular, combinations thereof, etc.). Moreover, the communications medium 26 can extend across one or more LANs, WANs, public networks, the Internet, and the like.

Each task server 22 provides an operating system 40 to locally run at least one respective task server process 42. For example, the task server 22(1) provides an operating system 40(1) to run one or more task server process 42(1). Similarly, the task server 22(2) provides an operating system 40(2) to run one or more task server process 42(2), and so on.

In some arrangements, the task servers 22 are implemented as physical machines, i.e., the operating systems 40 and the task server processes 42 run natively on the physical machines. In these arrangements, each physical machine preferably enjoys its own set of physical resources, e.g., power sources, processor capacity, memory, etc. for maximum redundancy of physical resources. The system 20 is easily scaled by increasing the number of task server processes 42 running on the physical machines and/or increasing the number of or the compute power of the physical machines in the system 20.

In other arrangements, the task servers 22 are implemented as virtual machines running on a pool of host devices. In these arrangements, a particular host device may support one or more guest operating systems and provide additional flexibility and efficiencies with regard to the sharing of computer resources. Similarly, system capacity can be easily increased by increasing the number of or the compute power of the host devices.

In yet other arrangements, the task servers 22 include both physical machine task servers implemented as physical machines, and virtual machine task servers implemented as virtual machines running on a set of host devices. Here, the physical machine task servers and the virtual machine task servers cooperatively operate to carry out the dependency-related predefined activities 58 of the workflow 60 in a load balanced, fault tolerant manner.

The workflow management server 24 includes a design and compilation stage 50, storage 52, a distributed workflow controller 54, and tools 56. These components operate to provide users with a robust and reliable workflow development platform and runtime environment.

The design and compilation stage 50 enables users to create activities 58 and store the activities in the storage 52. Along these lines, a user enters input through a user interface such as an XML editor or a WYSIWYG design tool when creating the activities 58. With the activities 58 now in predefined form, the user creates one or more workflows 60 by inter-relating the activities 58 via dependency relationships and running a compiler. Activity B may depend on activity A if activity B must occur sequentially after activity A. Additionally, activity D may depend on activity C if activity C contains activity D as a child activity (perhaps along with other child activities). The Microsoft.NET Windows Workflow Foundation (WF) WYSIWYG designer available in Visual Studio and a standard C# compiler are examples of tools which are suitable for use as at least part of the design and compilation stage 50.

The storage 52 is a memory subsystem of the workflow management server 24, and is constructed and arranged to receive and store the predefined activities 58 and the workflows 60 from the design and compilation stage 50. The storage 52 is further constructed and arranged to receive and store other information 62 such as configuration data detailing particular attributes of the workflow system 20 (e.g., computer names, operating parameters, etc.), user account information, and so on. This configuration data may be entered and later modified by a user, or be made initially available as modifiable default settings.

As will be explained in further detail shortly, the predefined activities 58 are essentially blocks of code which are intended to run as atomic units, while a specific execution or instantiation of predefined activity 58 is referred to as a task. Each predefined activity 58 is capable of receiving input, processing the input and yielding an output in response to processing the input. Furthermore, a workflow 60 is a hierarchy of the predefined activities 58 that are arranged to execute in a well-defined order. That is, the user links predefined activities 58 together to form the workflow 60. Along these lines, the workflow 60 can be visualized as a flow diagram of dependency-related predefined activities 58 which is represented internally within the system 20 as an object graph.

The distributed workflow controller 54 is the portion of the workflow management server 24 which is responsible for controlling performance of the workflows 60 within the workflow system 20. The distributed workflow controller 54 controls initial deployment of the task server processes 42 among the task servers 22, as well as maintains an operating infrastructure (e.g., a transaction database, queues, heartbeat daemons, etc.) which controls any subsequent deployment of additional task server processes 42 and execution of tasks among the task server processes 42 during workflow performance. Additionally, the distributed workflow controller 54 logs transactions/progress made by the workflows 60.

The tools 56 are constructed and arranged to enable a user to monitor operation of the workflow system 20 as well as perform system administration operations and generate reports. For example, the tools 56 can search a transaction database of the distributed workflow controller 54 to track workflow progress, and survey trends and performance statistics.

It should be understood that the workflow system 20 essentially provides a product-agnostic core engine for carrying out useful work. For example, in the context of a digital asset management system (also see the other devices 28 in FIG. 1), the workflow system 20 can be configured to track digital asset transaction events occurring on various components of the digital asset management system (e.g., user workstations, laptops, database servers, etc.). In particular, the workflow system 20 can be configured to track the creation of a digital asset, copying of the digital asset, reading of the digital asset, modifying of the digital asset and deletion of the digital asset among other things. Additionally, the workflow system 20 can track locations of the digital asset, as well as where and when the digital asset is backed up and/or archived. An example of a digital asset management system for which the workflow system 20 can be used is described in U.S. application Ser. No. 11/283,252, entitled "Systems and Methods for Storing Meta-Data Separate from a Digital Asset," the entire teachings of which are hereby incorporated by reference.

It should be further understood that one or more of the software components of the workflow management server 24 and/or the task servers 22 can be delivered in the form of a computer program product 70 (illustrated generally by a diskette icon 70 in FIG. 1). Such a computer program product 70 can include computer readable media for storing instructions which are executed by computerized processor (e.g., a microprocessor, a set of processors, etc.). Examples of suitable computer readable media include tangible articles of manufacture and apparatus such as CD-ROM, flash memory, disk memory, tape memory, and the like. Further details will now be provided with reference to FIG. 2.

Workflow Control

Figure 2:
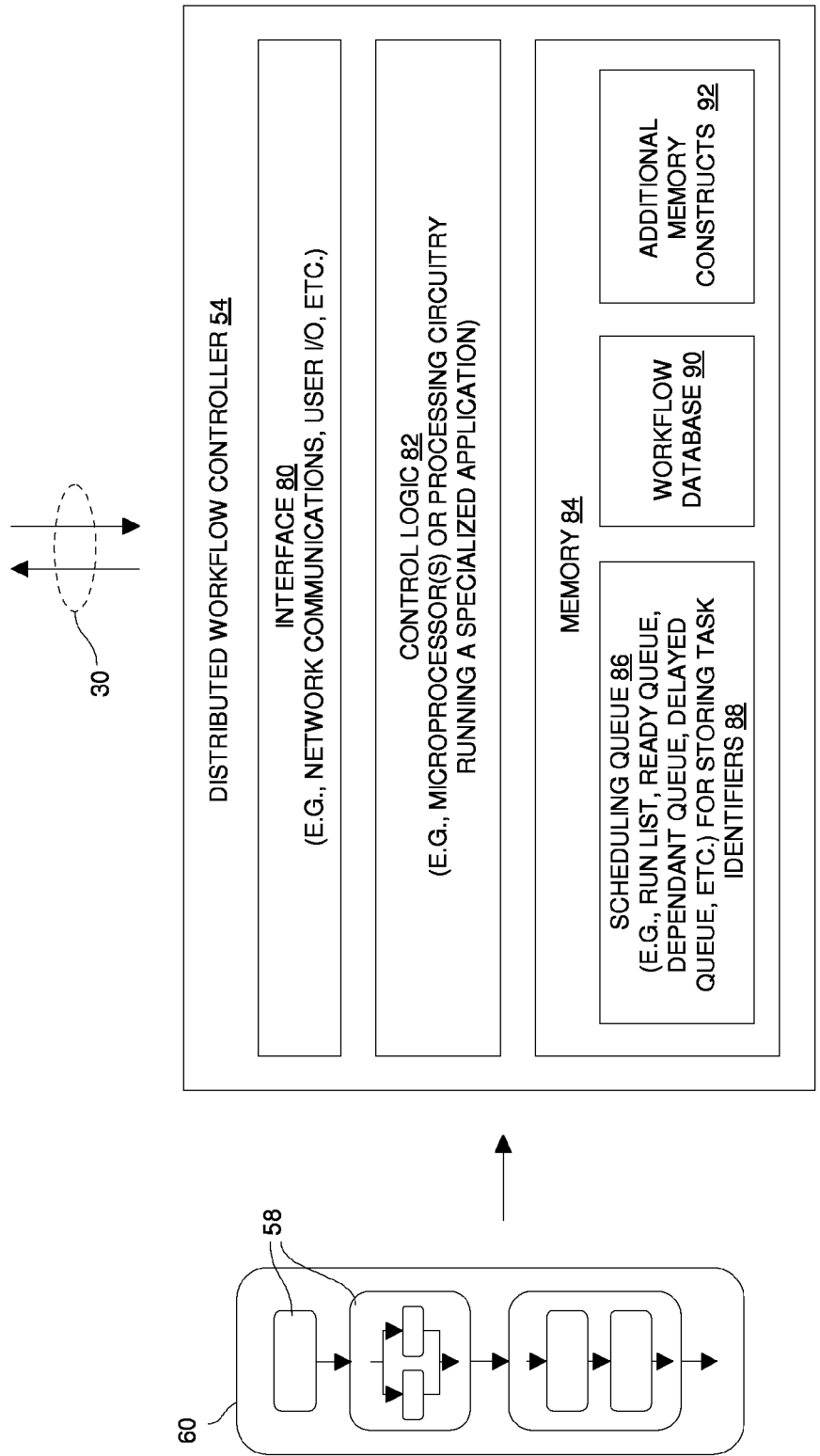
FIG. 2 is a block diagram of a distributed workflow controller of a workflow management server of the workflow system of FIG. 1.

FIG. 2 shows particular details of the distributed workflow controller 54. The distributed workflow controller 54 includes an interface 80, control logic 82, and memory 84. As mentioned earlier, the distributed workflow controller 54 controls deployment of the task server processes 42 as well as controls the operation of the system 20 (i.e., as a distributed workflow engine) during workflow runtime.

The interface 80 is configured to access the activities 58 and the workflows 60 from the storage 52 (also see FIG. 1). Additionally, the interface 80 communicates with the task servers 22 to manage task performance (also see the electronic data signals 30 in FIG. 1).

The memory 84 holds a scheduling queue (or queue structure) 86 for storing task identifiers 88 which identify specific executions of the predefined activities 58 (i.e., tasks) in various states. The scheduling queue 86 includes a variety of dedicated constructs which facilitate tracking and management of these tasks. In particular, the scheduling queue 86 includes a run list (or a claimed task list) which holds task identifiers 88 identifying tasks which are currently being executed by task server processes 42. The scheduling queue 86 further includes a ready queue (e.g., a pool of abortable, ready-to-run tasks) for holding task identifiers 88 identifying tasks which are ready for execution by a task server process 42.

The scheduling queue 86 further includes a dependant queue for holding task identifiers 88 which depend from currently running tasks and which are ready for execution as soon as the currently running tasks complete. The control logic 82 of the distributed workflow controller 54 automatically performs dependency tracking of the various tasks and maintains the dependant queue accordingly.

The scheduling queue 86 further includes a delayed queue for holding task identifiers 88 which are not yet ready or even almost ready for execution but belong to the workflow 60 currently being performed by the task servers 22 (e.g., lower level dependant tasks). It should be understood that appropriate reasons may exist as to why certain tasks might not yet be ready for execution. For example, a "pause" bit for a particular task might be set thus warranting placement of its task identifier 88 in the delayed queue. As another example, an explicit delay for a task might be specified, etc.

In some arrangements, the scheduling queue 86 is implemented as a single comprehensive task table and the various other queues (e.g., the ready queue, the dependant queue, the delayed queue, etc.) are essentially derived by filtering tasks listed in the task table using criteria such as creation time, run time, whether an error has occurred, whether a task is ready or running, whether a task has been given a high or low priority, and so on. Moreover, the various tasks can be prioritized by dynamically filtering and sorting task identifiers based on priorities and resource allocation.

The memory 84 further stores a workflow database 90 which is essentially a transaction log or archive of progress made by the workflow 60. As each task makes progress, the control logic 82 updates the workflow database 90 to record task progress. Other memory constructs 92 are stored in the memory as well such as a server table for tracking task server operation, and a process table for tracking task server process operation. The memory constructs 92 may further include other data such as system operating parameters, configuration information, etc.

In some arrangements, the task servers 22 activate themselves and proactively begin sending data to the workflow management server 24. In these arrangements, task servers 22 are automatically added/removed simply by turning them on/off (i.e., not through any central control logic). Such self-configuring operation makes the distributed workflow system 20 easy to manage and scale. Nevertheless, the workflow management server 24 can easily reconfigure or pause/resume each task server 22 once that task server 22 is up and running.

In other arrangements, the control logic 82 controls deployment of the task server processes 42 on the task servers 22 in addition to managing execution of the tasks among the task server processes 42 using the scheduling queue 86. In particular, to prepare the workflow system 20 to perform a workflow 60, the control logic 82 initially sends configuration commands to activate the task servers 22 (also see the electronic data signals 30 in FIG. 1). That is, based on the established operating parameters (see the memory constructs 92), the control logic 82 is able to dynamically add or remove task servers 22, and start task server processes 42 on the task servers 22. Along these lines, via the electronic data signals 30 (FIG. 1), the control logic 82 directs the number of task server processes 42 that should run on each task server 22.

Once a task server process 42 starts on a task server 22, that task server process 42 is ready to execute tasks and thus communicates with the workflow management server 42 (FIG. 1) to claim tasks for execution. Recall that the number of task server processes 42 running on each particular task server 22 may differ.

Next, the control logic 82 reads in the workflow 60 to be performed from the storage 52 and manages the scheduling queue 86 (FIG. 2). To effectuate workflow progress, the control logic 82 places task identifiers 88 in the scheduling queue 86 based on how the predefined activities 58 related to each other within the workflow 60.

The task server processes 42 then claim the task identifiers 88 from the scheduling queue 86 (i.e., a ready queue) and perform the tasks identified by the claimed task identifiers 88. The criteria for claiming tasks from the scheduling queue 86 may include selecting tasks (based on the task identifiers 88) having the earliest start time, the highest priority, the earliest creation time, and so on, depending on the nature and critical requirements of the workflow 60.

As mentioned earlier, the workflow 60 is preferably represented as an object graph in the memory 84. While the system 20 is running, modifications can be made dynamically to workflow definitions of the workflow 60. Along these lines, any workflow definitions which are added or updated within the memory 84 are further pushed from the workflow management server 24 to each task server 22 (also see FIG. 1). Details about various types of activities 58 will now be provided with reference to FIGS. 3A through 3D.

Workflow Structure

It should be understood that a task is a specific execution of a predefined activity 58. The task may transactional with respect to a database (e.g., in the context of a digital asset management system which records digital asset operations as transactions in the database). Each task includes task-specific logic (e.g., compiled code) for execution by task server process 42. It is only when the task has almost completed its execution (i.e., it has properly performed its useful work) does the task commit the database transaction and respond with a completion signal (e.g., see the electronic data signals 30 in FIG. 1) to indicate that any dependant tasks may be started.

If an error condition occurs during partial execution of a task, the results of the task can be easily nullified if the transactions have not yet been committed. Along these lines, even if changes have been made within the system 20, the workflow database 90 provides a log of events which enables these changes to be rolled back or undone. In such a situation, the control logic 82 of the distributed workflow controller 54 is able to formally kill that task and restart a new task in its place in order to fulfill the activity 58 defining the task.

FIGS. 3A through 3D show different types of activities 58 which can be used within a workflow 60. Recall that a workflow 60 is a hierarchy of activities 58 which are executed in a well-defined order. Along these lines, a workflow 60 can be visualized to a user as a flow diagram but represented within the workflow system 20 as an object path (also see the pictorial view of a workflow 60 in FIG. 2). The user composes a workflow 60 by operating the design and compilation stage 50 of the workflow management server 24 (FIG. 2) to link predefined activities 58 together. The end result is a workflow 60 which, when run on the workflow system 20, is capable of accomplishing an overall body of work in a distributed manner via the task servers 22 (e.g., tracking operations performed on digital assets within a digital asset management system).

Figure 3:
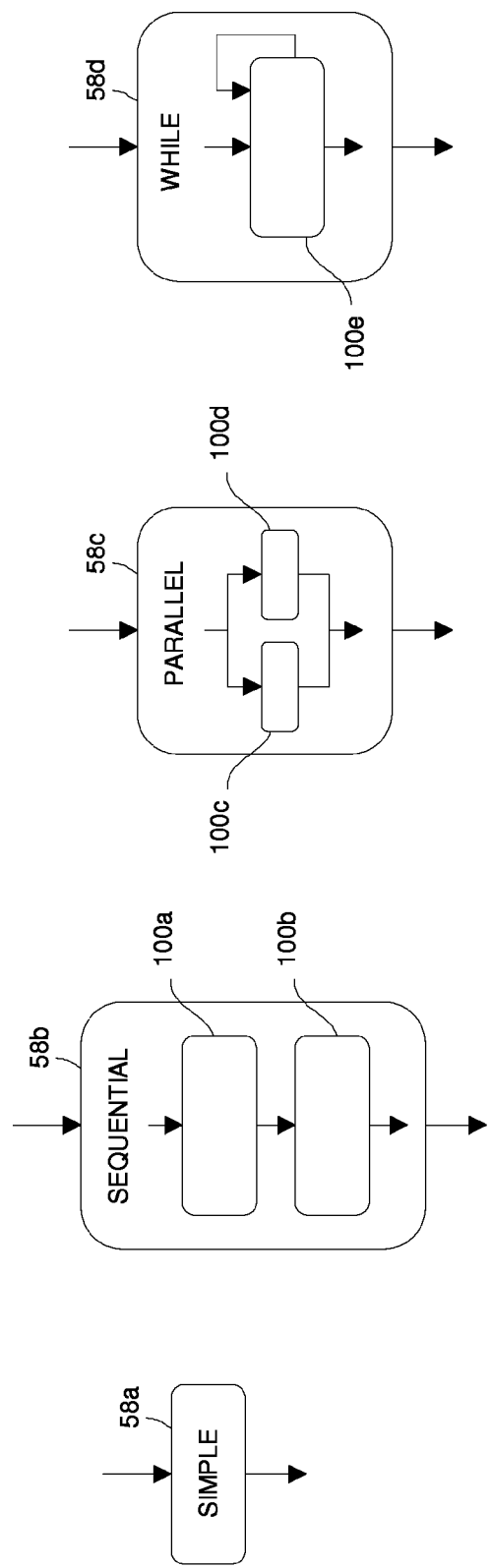
FIG. 3A is a diagram of a simple type of activity which is supported by the workflow system of FIG. 1.
FIG. 3B is a diagram of a sequential type of activity which is supported by the workflow system of FIG. 1.
FIG. 3C is a diagram of a parallel type of activity which is supported by the workflow system of FIG. 1.
FIG. 3D is a diagram of a while loop type of activity which is supported by the workflow system of FIG. 1.

FIG. 3A shows a simple type of predefined activity 58a which takes input, processes that input, and provides an output. Generally, this simple type of activity 58a is treated as a block of code which runs as an atomic unit. This basic form is available for use by other compound types of activities 58.

FIG. 3B shows a sequential activity 58b which contains multiple child activities 100a, 100b. Here, child activity 100a and child activity 100b are linked by a dependency relationship for serial execution. In particular, child activity 100b is a dependant (or next) activity of child activity 100a and thus cannot run until child activity 100a has completed. During execution, the activity 58b is treated as an atomic unit. Accordingly, when the activity 58b runs as a task, if one of the contained child activities 100a, 100b were to fail during execution, the execution of the entire activity 58b can be undone (i.e., rolled back) and re-queued as a new task.

FIG. 3C shows a parallel activity 58c which contains multiple child type activities 100c, 100d. For the parallel activity 58c, child activity 100c and child activity 100d are linked for parallel execution. Along these lines, the parallel activity 58c lists the activities 100c, 100d as child activities from a hierarchical perspective. Accordingly, it is possible that two separate task server processes 42 could execute the child activities 100c and 100d simultaneously. Nevertheless, if execution of one (or both) of the child activities 100c, 100d were to fail during execution, execution of the entire activity 58c can be undone and re-queued as a new task.

FIG. 3D shows a while activity 58d while contains a child activity 100e (or perhaps a group of child activities) defining a code branch for while loop functionality. Here, it is possible for the activity 58d to run in a continuous loop for an extended period of time.

It should be understood that FIGS. 3A through 3D show basic and compound structures for the predefined activities 58 which are suitable for use by the workflow system 60. Other structures are suitable for use as well such as custom structures which include one or more of the various activity types described above. For example, a particular custom activity 58 can include at least one child sequential activity 58b, at least one child parallel activity 58c and at least one child while activity 58d. Other combinations are available as well. Further details will now be provided with reference to FIG. 4.

Runtime Operation

Figure 4:
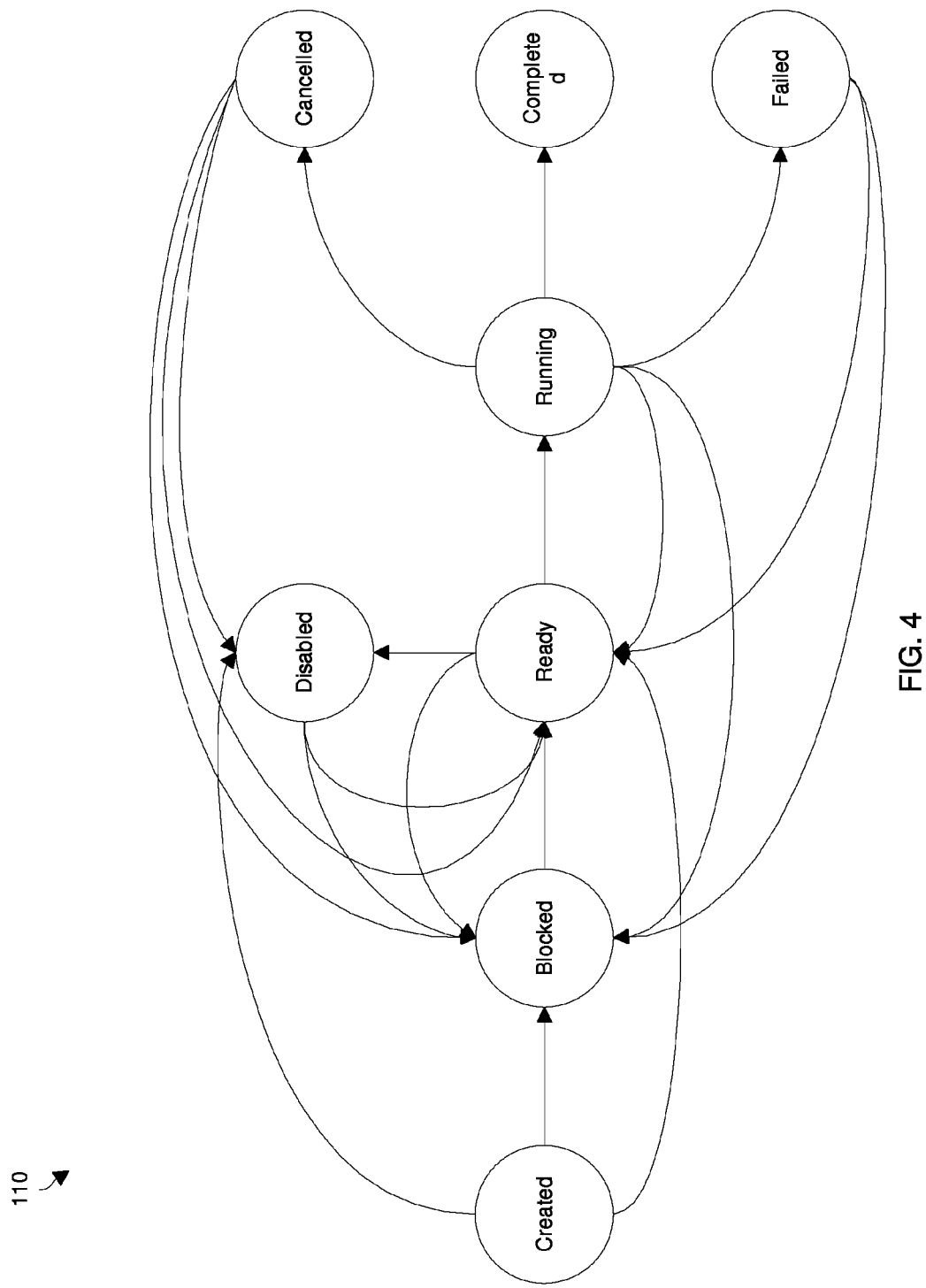
FIG. 4 is a diagram of various states for tasks (i.e., instantiations of predefined activities) handled by the workflow system of FIG. 1.

FIG. 4 shows a state diagram 110 which is suitable for use by the tasks managed by the distributed workflow controller 54 (FIG. 2). The various task states include a "created" state, a "blocked" state, a "ready" state, a "running" state, a "completed" state, a "disabled" state, a "canceled" state, and a "failed" state. Other states are suitable for use as well.

A task is in the created state when the task is first instantiated by the distributed workflow controller 54. As shown in FIG. 4, a task in the created state can become disabled, ready or blocked. A disabled task is one that is temporarily stopped by the distributed workflow controller 54. A ready task is one which is ready for execution by a task server process 42.

A blocked task is one that is almost about to reach the ready state. Along these lines, a blocked task may depend from another task which has not yet completed but is otherwise ready for execution, or may be waiting for a "constrained resource" to become available. In some arrangements, the system 20 enables definition of particular resources, and the maximum number of tasks that may run against those resources. For example, several tasks may require use of a printer, and the system 20 may be configured such that no more than one of these printer tasks is able to run at a time. In this example, two of these printer tasks cannot run concurrently and, if two or more of these printer tasks were otherwise eligible to run, all but one of these tasks would be "blocked".

A running task is one which is currently executing on a task server 22. A task in the running state can be canceled, can be completed or can fail. A canceled task is one that is purposefully stopped by the distributed workflow controller 54, perhaps due to a user command. A failed task is one that has encountered a fault, e.g., perhaps the task has stalled, has entered a runaway condition, or has timed out. A completed task is one that has properly finished, has completed as much work as possible within a pre-defined time limit and/or a data processing time limit, and perhaps has one or more dependant tasks awaiting execution.

It should be understood that the control logic 82 of the distributed workflow controller 54 coordinates the tasks by moving the task identifiers 88 which identify the tasks between various parts of the scheduling queue 86 (or alternatively by updating fields of the scheduling queue 86). For example, running tasks reside on the run list of the scheduling queue 86. Additionally, ready tasks reside on the ready queue, blocked tasks reside on either the dependant queue (i.e., the identified dependant queue tasks are ready to run as soon as earlier tasks from which the identified tasks depend have completed) or the delayed queue. As tasks complete, the control logic 82 moves task identifiers 88 identifying their immediate dependants from the dependant queue to the ready queue, and so on.

As the task server processes 42 (FIG. 1) become available to execute workflow activities 58, the task server processes 42 claim tasks to execute from the distributed workflow controller 54 based on the task identifiers 88 currently in the ready queue of the scheduling queue 86. When a task server process 42 claims a particular task, the task server process 42 executes task-specific logic of the workflow activity 58 defining that task. Optimistic locking techniques can be employed to optimally and reliably resolve race conditions related to multiple servers simultaneously attempting to claim tasks. To complete the particular task, the task server process 42 enters a transaction to the workflow database 90 to record completion of the task. Accordingly, the control logic 82 is able to effectively and efficiently control and monitor workflow performance.

It should be understood that the workflow database 90 can be queried by the tools 56 (FIG. 1) and thus provide status and performance statistics to a user. For example, monitoring tools are capable of providing real-time status of the operation of the workflow system 20 as progress is made during workflow performance. Additionally, reporting tools are capable of providing a log or transactional history of workflow completion to the user. Furthermore, statistical tools are capable of generating reports which enable the user to analyze performance and perhaps dynamically adjust or fine-tune particular aspects of the workflow system 20, e.g., the user can change the number of task server processes 42 which run on each task server 22 on the fly (i.e., start or stop processes 42) and thus dynamically modify load balancing aspects of the system 20. Further details will now be provided with reference to FIG. 5.

Heartbeat Operation

FIG. 5 shows a process table 120 which is maintained by the control logic 82 of the distributed workflow controller 54 to monitor operation of the task server processes 42 running on the task servers 22 (also see the additional memory constructs 92 in FIG. 2). As shown, the process table 120 includes task server process entries 122(1), 122(2), . . . (collectively, entries 122) corresponding to the task server processes 42 running on the task servers 22 (also see FIG. 1).

Each task server process entry 122 includes a task server process identifier 124, last ping time data 126, CPU utilization data 128, task count data 130, free memory data 132, and additional information 134 (e.g., enable flags, priorities, etc.). The task server process identifier 124 identifies a particular task server process 42 running on a particular task server 22 (recall that each task server 22 is able to run multiple task server processes 42). The last ping time data 126 identifies runtime aspects of that task server process 42 such as when the control logic 82 of the distributed workflow controller 54 last communicated with that task server process 42. Along these lines, each task server 22 (or alternatively each task server process 42) is configured to periodically output a heartbeat signal (also see the electronic data signals 30 in FIG. 1) to indicate that the task server 22 (or task server process 42) is still operational.

The CPU utilization data 128 indicates a current CPU utilization and a maximum CPU utilization measurement for the task server process 42. The task count data 130 indicates task count statistics such as the task identifier of the task currently being executed by that task server process 42, an active task count, the minimum task count, and the maximum task count. The free memory data 132 indicates the amount of free currently memory available to the task server process 42.

It should be understood that the control logic 82 of the distributed workflow controller 54 continuously updates the process table 120 in response to communications from the task server processes 42. Since different predefined activities 58 are configured to perform different operations, a particular executing task may consume a larger amount or a smaller amount of task server resources compared to other tasks. In an ongoing manner, the control logic 82 updates the information in the process table 120 to enable, among other things, the control logic 82 to identify whether any task server processes have encountered a fault.

Additionally, the task servers 22 check for stalled/inactive tasks currently being executed by other task servers 22. If a particular task server 22 discovers a stalled or inactive task on another task server 22, the particular task server 22 signals the control logic 82 of the distributed workflow controller 54 (FIG. 2) of this discovery and makes itself available to take over that task.

Alternatively or in addition to the above-described responsive operation of the control logic 22, the control logic 82 routinely scans the data within the process table 120 to identify tasks which have stalled, runaway, aborted, etc. In some arrangements, the control logic 82 checks the task server processes 42 of a particular task server 22 when updating the process entry 122. During such checking, the control logic 82 analyzes the data within the task server process entries 122 to detect whether any tasks have failed.

Once the control logic 82 discovers a failed task, the control logic 82 moves the task identifier of that task currently in the task count data 130 into a kill list (also see the scheduling queue 86 in FIG. 2). Then, routinely (e.g., after every five heartbeat signals if a heartbeat signal occurs once every minute), the control logic 82 kills tasks on the kill list and adds new tasks in their place in the scheduling queue 86.

It should be understood that, as partially completed tasks are killed and re-queued as new tasks, the control logic 82 may need to nullify or roll back transactions which were performed by the partially completed tasks. To this end, the control logic 82 is able to nullify non-committed transactions or roll back or undue completed transactions based on records in the workflow database 90. Such operation preserves the atomic behavior of each task.

It should be further understood that the system 20 is capable of handling failure of an entire task server 22, i.e., the task server 22 may itself stall/die. In such a situation, the remaining task servers 22 reclaim all of the uncompleted tasks that were running on the failed task server 22 for robust fault tolerant operation.

CONCLUSION

Figure 6:
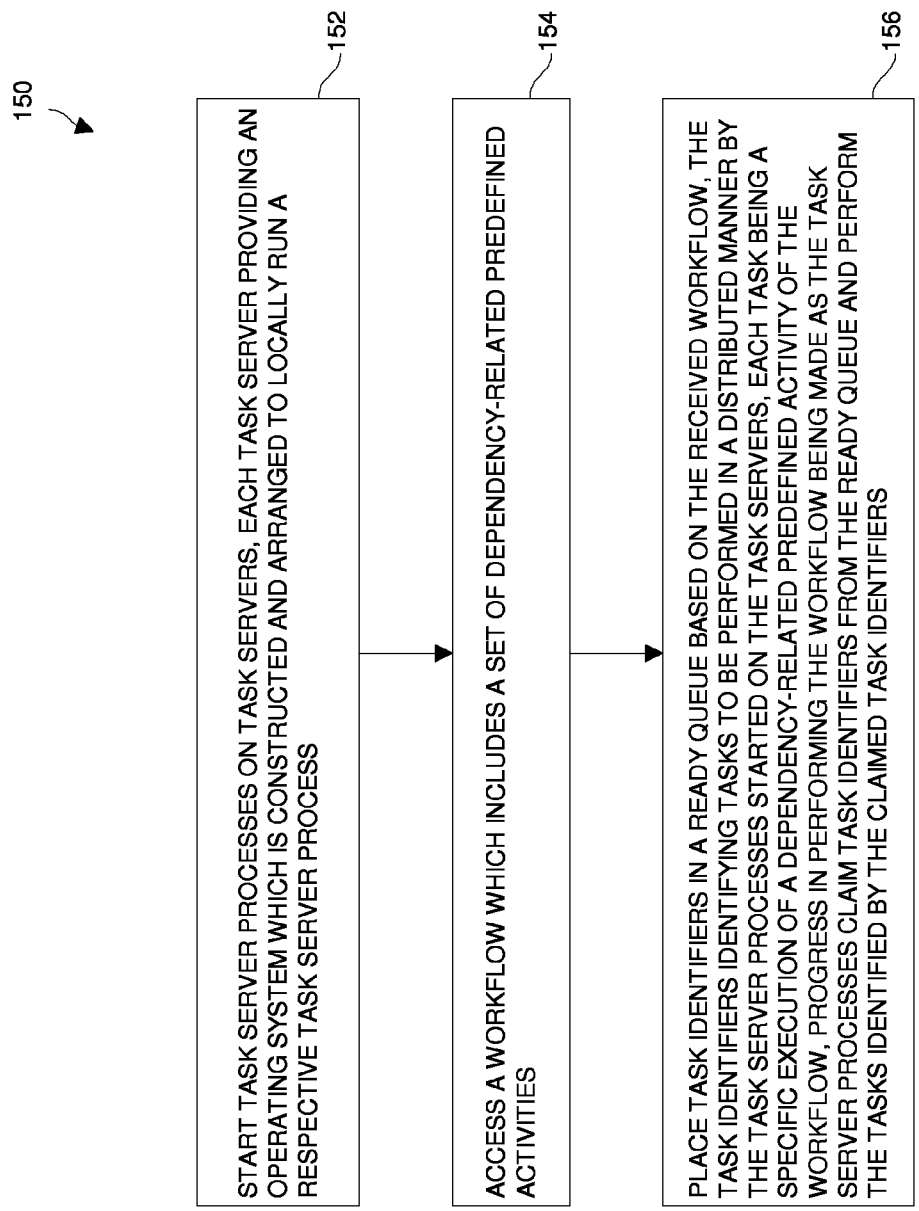
FIG. 6 is a flowchart of a method which is performed by the distributed workflow controller of FIG. 2.

FIG. 6 is a flowchart of a method 150 which is performed by the distributed workflow controller 54 of the workflow management server 24 (FIG. 1) to perform a workflow 60. In step 152, the distributed workflow controller 54 starts task server processes 42 on the task servers 22. Recall that each task server 22 provides an operating system which is constructed and arranged to locally run one or more task server process 42. It should be understood that the workflow controller 54 is capable of dynamically increasing or decreasing the number of running task server processes 42 at any time.

In step 154, the distributed workflow controller 54 accesses a workflow 60 from the storage 52 (FIG. 1). Along these lines, the workflow 60 includes a set of dependency-related predefined activities 58, and the distributed workflow controller 54 is able to read and create task identifiers 88 for these activities 58.

In step 156, the distributed workflow controller 54 places the task identifiers 88 in the scheduling queue 86 (FIG. 2). Once the task identifiers 88 are moved to the ready queue of the scheduling queue 86, the task server processes 42 running on the task servers 22 are able to claim and execute them from the ready queue, and then execute the tasks in a distributed manner.

At this point, it should be understood that the workflow system 20 is easily scalable. In particular, to increase the throughput of the system 20, one or more task server processes 42 and/or one or more task servers 22 can be added to the system 20. Once the task server processes 42 have been deployed, the tasks are automatically load balanced across the task server processes 42 as the task server processes 42 claim and execute the tasks from the ready queue.

Additionally, it should be understood that the workflow system 20 has built-in fault tolerance. In particular, if a task should encounter a fault, it can be killed and restarted as a new task. Moreover, as long as other task servers 22 and task server processes 42 are available, the system 20 can suffer a loss of an entire task server process 42 or an entire task server 22, but nevertheless complete the workflow 60 using the remaining task servers 22 and task server processes 42.

Furthermore, it should be understood that the workflow system 20 is flexible and user friendly. Along these lines, priorities can be assigned to the workflows 60 and/or the activities 58, to finely tune the operation of the system 20. Moreover, more than one workflow 60 can be performed on the system 20 at any one time, and workflows 60 can be dynamically added during system operation.

As described above, improved techniques utilize multiple task servers 22 equipped with operating systems 40 that locally run task server processes 42. These task server processes 42 running on the task servers 22 claim workflow tasks (i.e., instantiations of activities 58) from a queue of ready-to-execute workflow tasks. When a task server process 42 has completed a task, the task server process 42 claims a new task from the queue. As a result, the task server processes 42 naturally and effectively achieve load balancing. Additionally, if a partially performed task fails or improperly stalls, the workflow management server 24 is able to detect this situation and roll back any transactions of that task and then re-queue the task, i.e., queue a new task that can complete all of the transactions successfully.

While various embodiments of the invention have been particularly shown and described, it will be understood by those skilled in the art that various changes in form and details may be made therein without departing from the spirit and scope of the invention as defined by the appended claims.

For example, it should be understood that the workflow system 20 was described above as operating as part of a digital asset management system by way of example only. Other uses are suitable for the workflow system 20 as well. Along these lines, the workflow system 20 is essentially available as a product-agnostic core engine. Accordingly, any type of work which is appropriate for a workflow 60 can utilized this product-agnostic core engine.

Additionally, the task servers 22 can be implemented as either a physical machine or a virtual machine. If the task servers 22 are implemented as virtual machines, the task servers 22 can be relocated across different host devices during workflow runtime thus adding further flexibility to the operation of the workflow system 20. Such modifications and enhancements are intended to belong to various embodiments of the invention.

What is claimed is:

1. A method of performing a workflow on a plurality of task servers, the method comprising:
   starting a plurality of task server processes on the plurality of task servers, each task server providing an operating system which is constructed and arranged to locally run a respective task server process;
   receiving a workflow which includes a set of dependency-related predefined activities;
   placing task identifiers in a queue structure based on the received workflow, the task identifiers identifying tasks to be performed in a distributed manner by the plurality of task server processes started on the plurality of task servers, each task being a specific execution of a dependency-related predefined activity of the workflow, progress in performing the workflow being made as the plurality of task server processes (i) claim task identifiers from the queue structure and (ii) perform the tasks identified by the claimed task identifiers; and
   as one of the tasks completes or in response to completing the one of the tasks, placing a task identifier for another task dependent on the one of the tasks from a dependent queue in the queue structure to a ready queue in the queue structure.

2. A method as in claim 1, further comprising:
   in response to a task server process running on a task server claiming a task identifier from the queue structure for the one of the tasks:
      executing, by the task server process, task-specific logic for the one of the tasks, wherein the one of the tasks is for a particular dependency-related predefined activity of the workflow, and
   committing a transaction to a workflow database to record completion of the task-specific logic in response to the task server process completing execution of the task-specific logic.

3. A method as in claim 2 wherein the particular dependency-related predefined activity identifies a subsequent predefined activity of the workflow for the another task which depends from the particular dependency-related predefined activity; and
   wherein prior to committing the transaction to the workflow database to record completion of the task-specific logic, placing the task identifier for the another task in the ready queue.

4. A method as in claim 3, further comprising:
   generating a workflow completion report based on transactions committed to the workflow database, the workflow completion report identifying a log of workflow completion to a user.

5. A method as in claim 1 wherein the plurality of task servers are constructed and arranged to periodically output heartbeat signals;
   wherein each task server process, when claiming a task identifier from the queue structure, is constructed and arranged to de-queue the task identifier from the ready queue and update a claimed tasks list; and wherein the method further comprises monitoring the claimed tasks list and the heartbeat signals periodically outputted by the plurality of task servers to detect any task which has stalled.

6. A method as in claim 5, further comprising:
upon detection of a particular task which has stalled based on monitoring the claimed tasks list and the heartbeat signals, rolling back any transactions made by the particular task and placing a new task identifier identifying the particular task in the ready queue.

7. A method as in claim 5, further comprising:
upon detection of a particular task server which has failed based on monitoring the claimed tasks list and the heartbeat signals, rolling back any transactions made by uncompleted tasks running on the particular task server and placing new task identifiers identifying the uncompleted tasks in the ready queue.

8. A method as in claim 1 wherein receiving the workflow includes:
acquiring, as the workflow, a hierarchy of the dependency-related predefined activities represented as an object graph in a memory subsystem of a workflow management server.

9. A method as in claim 8, further comprising:
updating workflow definitions of the object graph in the memory subsystem of the workflow management server, and sending the updated workflow definitions to the plurality of task servers from the workflow management server.

10. A method as in claim 8 wherein the hierarchy of the dependency-related predefined activities represented as the object graph is constructed and arranged to archive digital asset transactions of a digital asset management system.

11. A method as in claim 10 wherein the digital asset management system includes multiple host devices coupled to the workflow management server through a computer network; and
wherein each task server is implemented as a virtual machine on one of the host devices.

12. A method as in claim 10 wherein the digital asset management system includes multiple physical machines coupled to the workflow management server through a computer network; and
wherein each physical machine natively runs one of the task servers.

13. A system to perform a workflow which includes a set of dependency-related predefined activities, the system comprising:
a plurality of task servers; and
a workflow management server coupled to the plurality of task servers, wherein the workflow management server includes a processor, and the workflow management server is to:
start a plurality of task server processes on the plurality of task servers, each task server providing an operating system to locally run a respective task server process, maintain a queue structure, and
place task identifiers in the queue structure, the task identifiers identifying tasks to be performed in a distributed manner by the plurality of task server processes started on the plurality of task servers, each task being a specific execution of a dependency-related predefined activity of the workflow, progress in performing the workflow being made as the plurality of task server processes (i) claim task identifiers from the queue structure and (ii) perform the tasks identified by the claimed task identifiers, and
as one of the tasks completes or in response to completing the one of the tasks, the workflow management server is to place a task identifier for another task dependent on the one of the tasks from a dependent queue in the queue structure to a ready queue in the queue structure.

14. A system as in claim 13 wherein, in response to a particular task server process running on a task server claiming a task identifier from the queue structure for the one of the tasks, the task server process is to:
execute task-specific logic for the one of the task, wherein the one of the tasks is for a particular dependency-related predefined activity of the workflow, and
commit a transaction to a workflow database to record completion of the task-specific logic in response to the task server process completing execution of the task-specific logic.

15. A system as in claim 14 wherein the particular dependency-related predefined activity identifies a subsequent predefined activity of the workflow for the another task which depends from the particular dependency-related predefined activity; and
wherein prior to committing the transaction to the workflow database to record completion of the task-specific logic, the workflow management server is to place the task identifier for the another task in the ready queue.

16. A system as in claim 13 wherein the plurality of task servers are constructed and arranged to periodically output heartbeat signals;
wherein each task server process, when claiming a task identifier from the queue structure, is constructed and arranged to de-queue the task identifier from the ready queue and update a claimed tasks list; and
wherein the workflow management server is further to (i) monitor the claimed tasks list and the heartbeat signals periodically outputted by the plurality of task servers to detect any task which has stalled and (ii) upon detection of a particular task which has stalled based on monitoring the claimed tasks list and the heartbeat signals, roll back any transactions made by the particular task and place a new task identifier identifying the particular task in the queue structure.

17. A system as in claim 13 wherein the workflow management server, when starting the plurality of task server processes on the plurality of task servers, is to send startup commands to the plurality of task servers to start the plurality of task server processes; and
to receive the workflow, the workflow management server is to acquire, as the workflow, a hierarchy of the dependency-related predefined activities represented as an object graph in a memory subsystem of the workflow management server, the hierarchy of the dependency-related predefined activities represented as the object graph to archive digital asset transactions of a digital asset management system.

18. A system as in claim 17 wherein the plurality of task servers are implemented as virtual machines running on a plurality of host devices.

19. A system as in claim 17 wherein the plurality of task servers are implemented as physical machines which communicate with the workflow management server through a computer network; and
wherein each physical machine natively runs one of the task servers.

20. A system as in claim 17 wherein the plurality of task servers includes:

a set of physical machine task servers implemented as physical machines, and a set of virtual machine task servers implemented as virtual machines running on a set of host devices, the set of physical machine task servers and the set of virtual machine task servers cooperatively operating to carry out the set of dependency-related predefined activities of the workflow in a load balanced, fault tolerant manner.

* * * * *